United States Patent
Li et al.

(10) Patent No.: US 12,388,091 B2
(45) Date of Patent: Aug. 12, 2025

(54) SOLID OXIDE FUEL CELL AND MANUFACTURING METHOD OF THE SAME

(71) Applicant: TAIYO YUDEN CO., LTD., Tokyo (JP)

(72) Inventors: Xinyu Li, Tokyo (JP); Chie Kawamura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 10 days.

(21) Appl. No.: 17/031,666

(22) Filed: Sep. 24, 2020

(65) Prior Publication Data

US 2021/0104753 A1 Apr. 8, 2021

(30) Foreign Application Priority Data

Oct. 7, 2019 (JP) .................. 2019-184725

(51) Int. Cl.
| | |
|---|---|
| *H01M 4/90* | (2006.01) |
| *H01M 4/86* | (2006.01) |
| *H01M 4/88* | (2006.01) |
| *H01M 8/12* | (2016.01) |
| *H01M 8/1213* | (2016.01) |

(52) U.S. Cl.
CPC ....... *H01M 4/9033* (2013.01); *H01M 4/8657* (2013.01); *H01M 4/8885* (2013.01); *H01M 4/9066* (2013.01); *H01M 8/1213* (2013.01); *H01M 2008/1293* (2013.01)

(58) Field of Classification Search
CPC ............. H01M 4/8652; H01M 4/8657; H01M 4/8885; H01M 4/9033; H01M 4/9066; H01M 8/1213; H01M 2008/1293; Y02P 60/50; Y02P 70/50
See application file for complete search history.

(56) References Cited

U.S. PATENT DOCUMENTS

| 4,767,680 A | 8/1988 | Hijikata ................... 429/456 |
|---|---|---|
| 5,670,270 A | 9/1997 | Wallin .................... 429/496 |
| 6,146,780 A | 11/2000 | Cisar ....................... 429/435 |
| 2002/0048699 A1 | 4/2002 | Steele et al. ............... 429/30 |
| 2004/0043272 A1* | 3/2004 | Gorte .............. H01M 4/8885 |
| | | 429/488 |

(Continued)

FOREIGN PATENT DOCUMENTS

| CN | 1897337 A  * | 1/2007 |
|---|---|---|
| CN | 103765647 A | 4/2014 |

(Continued)

OTHER PUBLICATIONS

Fabbri, Emiliana, et al. "Electrode materials: a challenge for the exploitation of protonic solid oxide fuel cells." Science and technology of advanced materials (2010) (Year: 2010).*

(Continued)

*Primary Examiner* — Matthew T Martin
*Assistant Examiner* — Jared Hansen
(74) *Attorney, Agent, or Firm* — Stein IP LLC (57) ABSTRACT

A solid oxide fuel cell includes a support of which a main component is a metal, and an anode supported by the support, wherein the anode includes a first oxide having electron conductivity, wherein the first oxide is perovskite type oxide expressed as a composition formula $ABO_3$, wherein "A" of the composition formula includes at least one of Ca, Sr, Ba and La, wherein "B" of the composition formula includes at least Cr.

12 Claims, 3 Drawing Sheets

(56) References Cited

U.S. PATENT DOCUMENTS

| | | |
|---|---|---|
| 2004/0247978 A1 | 12/2004 | Shimamune ............. 428/685 |
| 2005/0019642 A1 | 1/2005 | Hishitani ................ 429/465 |
| 2005/0266297 A1 | 12/2005 | Irvine et al. ............. 429/40 |
| 2006/0113034 A1* | 6/2006 | Seabaugh ........ H01M 8/1246 156/308.2 |
| 2006/0127749 A1 | 6/2006 | Christie ................ 427/126.3 |
| 2006/0286433 A1 | 12/2006 | Rakowski ............. 429/455 |
| 2007/0269701 A1 | 11/2007 | Larsen et al. ............. 429/33 |
| 2007/0275292 A1 | 11/2007 | Sin Xicola ............. 429/495 |
| 2008/0090127 A1 | 4/2008 | Gorte ................... 429/535 |
| 2009/0061279 A1 | 3/2009 | Larsen ................... 429/410 |
| 2010/0028757 A1 | 2/2010 | Fu et al. ................ 429/40 |
| 2010/0178589 A1 | 7/2010 | Kwon ................... 429/535 |
| 2012/0003565 A1 | 1/2012 | Son ..................... 429/496 |
| 2012/0082920 A1 | 4/2012 | Mukerjee .............. 429/495 |
| 2012/0129039 A1 | 5/2012 | Drenckhahn ........... 429/223 |
| 2013/0157166 A1 | 6/2013 | Tsai ..................... 429/481 |
| 2013/0224628 A1* | 8/2013 | Moon ............. H01M 4/8657 429/479 |
| 2013/0295489 A1* | 11/2013 | Kim ............... H01M 4/8605 264/105 |
| 2014/0072836 A1* | 3/2014 | Mills ................ H01M 14/00 429/422 |
| 2014/0170529 A1 | 6/2014 | Jain ..................... 252/518.1 |
| 2014/0170532 A1 | 6/2014 | Ohtani et al. ............. 429/534 |
| 2014/0242858 A1 | 8/2014 | Ochiai et al. ............. 440/88 M |
| 2014/0287342 A1 | 9/2014 | Jabbar et al. ............. 429/482 |
| 2015/0064596 A1 | 3/2015 | Leah ................... 429/465 |
| 2015/0194682 A1 | 7/2015 | Ashary ................ 429/468 |
| 2017/0273769 A1 | 9/2017 | Dengler ............ A61C 17/3472 |
| 2018/0019493 A1 | 1/2018 | Jakus |
| 2018/0323443 A1 | 11/2018 | Tucker et al. ........ H01M 4/8882 |
| 2019/0081331 A1 | 3/2019 | Bauer |
| 2019/0088969 A1 | 3/2019 | Koizumi et al. ..... H01M 8/1226 |
| 2019/0140287 A1 | 5/2019 | Liu et al. ............ H01M 4/8882 |
| 2019/0296385 A1 | 9/2019 | Sugihara |
| 2022/0200033 A1 | 6/2022 | Seno et al. ........ H01M 8/1213 |

FOREIGN PATENT DOCUMENTS

| | | | | |
|---|---|---|---|---|
| CN | 107994234 A | * | 5/2018 | ............ B82Y 30/00 |
| JP | H 04-075262 | | 7/1990 | |
| JP | H 07-249412 A | | 9/1995 | |
| JP | H 09-027330 A | | 1/1997 | |
| JP | 2004512651 A | | 4/2004 | |
| JP | 2005-535084 A | | 11/2005 | |
| JP | 2008502113 A | | 1/2008 | |
| JP | 2009-541955 A | | 11/2009 | |
| JP | 2012-033418 A | | 2/2012 | |
| JP | 2012190746 A | | 10/2012 | |
| JP | 2013012473 A | | 1/2013 | |
| JP | 2014163286 A | | 9/2014 | |
| JP | 2015-153467 A | | 8/2015 | |
| JP | 2016039099 A | | 3/2016 | |
| JP | 2016-115506 A | | 6/2016 | |
| JP | 2017033799 A | | 2/2017 | |
| JP | 2017525431 A | | 9/2017 | |
| JP | 2018-055946 A | | 4/2018 | |
| JP | 2020087792 A | | 11/2018 | |
| JP | 2019517098 A | | 6/2019 | |
| JP | WO 2019/159276 A1 | | 8/2019 | |
| JP | 2012-074307 A | | 4/2021 | |
| WO | WO 98/49738 A1 | | 11/1998 | |
| WO | WO 2014/046196 A1 | | 3/2014 | |
| WO | WO 2018042476 A1 | | 3/2018 | |
| WO | WO 2020/218431 A1 | | 10/2020 | |

OTHER PUBLICATIONS

Ju, Young-Wan, et al. "New buffer layer material La (Pr) CrO3 for intermediate temperature solid oxide fuel cell using LaGaO3-based electrolyte film." Journal of Materials Research 27 (2012): 1906-1914 (Year: 2012).*

Vert, Vicente B., et al. "Redox stability and electrochemical study of nickel doped chromites as anodes for H2/CH4-fueled solid oxide fuel cells." Applied Catalysis B: Environmental 115 (2012): 346-356. (Year: 2012).*

Oh, Tae-Sik, et al. "Infiltrated lanthanum strontium chromite anodes for solid oxide fuel cells: Structural and catalytic aspects." Journal of Power Sources 262 (2014): 207-212 (Year: 2014).*

Yan, Yan, et al. "Fabrication of reactive element oxide coatings on porous ferritic stainless steel for use in metal-supported solid oxide fuel cells." Surface and Coatings Technology 272 (2015): 415-427 (Year: 2015).*

Huang, B., et al. "Characterization of a Cu—La0. 75Sr0. 25Cr0. 5Mn0. 5O3-CeO2/La0. 75Sr0. 25Cr0. 5Mn0. 5O3-YSZ/Ni—ScSZ three-layer structure anode in thin film solid oxide fuel cell running on methane fuel." Fuel Cells 15 (2015): 398-407. (Year: 2015).*

Wasilewski, Eric, et al. "Cu/LaCrO3 joining by local melt infiltration through laser cladding." Journal of the American Ceramic Society 101 (2018): 4472-4479. (Year: 2018).*

Gupta, Sapna, Manoj K. Mahapatra, and Prabhakar Singh. "Lanthanum chromite based perovskites for oxygen transport membrane." Materials Science and Engineering: R: Reports 90 (2015): 1-36 (Year: 2015).*

Gao, Zhan, et al. "A perspective on low-temperature solid oxide fuel cells." Energy & Environmental Science 9.5 (2016): 1602-1644 (Year: 2016).*

Fan, W., et al. "Improved properties of scandia and yttria co-doped zirconia as a potential thermal barrier material for high temperature applications." Journal of the European Ceramic Society 38.13 (2018): 4502-4511 (Year: 2018).*

WO2019159276A1, Shibata, et al., "Metal Supported Cell", machine English translation retrieved from https://worldwide.espacenet.com/ on Dec. 8, 2022 (Year: 2019).*

CN1897337A, Gao Jianfeng Meng, "Solid oxide fuel battery anode and its production", machine English translation retrieved from https://worldwide.espacenet.com/ Date: Aug. 2, 2023 (Year: 2007).*

Jiang, San Ping, et al. "Electrical conductivity and performance of doped LaCrO3 perovskite oxides for solid oxide fuel cells." Journal of Power Sources 176.1 (2008): 82-89 (Year: 2008).*

Teocoli, Francesca, et al. "Effects of co-sintering in self-standing CGO/YSZ and CGO/ScYSZ dense bi-layers." Journal of Materials Science 49 (2014): 5324-5333 (Year: 2014).*

CN107994234A, Fan, "Ceramic fuel cell and fabrication method thereof", machine English translation retrieved from https://worldwide.espacenet.com/ Date: Dec. 12, 2023 (Year: 2018).*

Irvine, John Thomas Sirr. "Perovskite oxide anodes for SOFCs." Perovskite oxide for solid oxide fuel cells (2009): 167-182 (Year: 2009).*

"What is Spark Plasma Sintering" California Nanotechnologies—Intro to Spark Plasma Sintering, https://www.calnanocorp.com/what-is-spark-plasma-sintering accessed Aug. 1, 2024 (Year: 2023).*

Notice of Reasons for Refusal issued on May 9, 2023, in related Japanese Patent Application No. 2019-157789.

Notice of Reasons for Refusal issued on Jul. 25, 2023 in related Japanese Patent Application No. 2019-184725.

Notification of First Office Action dated Oct. 26, 2023, issued by the China National Intellectual Property Administration in corresponding application CN 202011030776.X.

Peter Blennow et al., "Development of Planar Metal Supported SOFC with Novel Cermet Anode", ECS Transactions, 25 (2) 701-710 (2009).

Office Action issued on Oct. 19, 2023, in a counterpart Chinese Patent Application No. 202110245145.8.

A Notice of Reasons for Refusal issued by the Japanese Patent Office, mailed Dec. 6, 2022, for Japanese counterpart application No. 2018-222503. (3 pages).

A Notice of Reasons for Refusal issued by the Japanese Patent Office, mailed Sep. 6, 2022, for Japanese counterpart application No. 2018-222503. (5 pages).

Notice of Reasons for Refusal issued on Jan. 23, 2024 in a counterpart Japanese Patent Application No. 2020-040846.

Office Action issued on Dec. 20, 2023 in a related Chinese Patent Application No. 202010884982.0.

(56) References Cited

OTHER PUBLICATIONS

Chinese Office Action issued on Jun. 24, 2024 in a related Chinese Patent Application No. 202010884982.0.

* cited by examiner

SOLID OXIDE FUEL CELL AND MANUFACTURING METHOD OF THE SAME

CROSS-REFERENCE TO RELATED APPLICATION

This application is based upon and claims the benefit of priority of the prior Japanese Patent Application No. 2019-184725, filed on Oct. 7, 2019, the entire contents of which are incorporated herein by reference.

FIELD

A certain aspect of the present embodiments relates to a solid oxide fuel cell and a manufacturing method of the same.

BACKGROUND

The solid oxide fuel cell includes a solid oxide electrolyte layer having oxygen ion conductivity, an anode, and a cathode. At the anode, oxygen ions passing through the solid oxide electrolyte layer from the cathode react with hydrogen contained in a fuel gas. This reaction generates electrical power. It is necessary for the anode to have electron conductivity. And so, there is disclosed a technology in which an anode includes $LaTiO_3$-based material having the electron conductivity (see Japanese Patent Application Publication No. 2012-33418 and Japanese Patent Application Publication No. 2009-541955).

SUMMARY

There is a problem that solid oxide fuel cells made of ceramics are susceptible to thermal shock or mechanical shock. And so, it is thought that the fuel cells are supported by a metal member so as to high resistance against vibration, shock or rapid rate of rising and falling temperature. However, a metallic support is fired in strong reductive atmosphere in order to suppress oxidation of the metallic support. And so, developing of an anode which can be fired in the strong reductive atmosphere is requested.

According to a first aspect of the present embodiments, there is provided a solid oxide fuel cell including: a support of which a main component is a metal; and an anode supported by the support, wherein the anode includes a first oxide having electron conductivity, wherein the first oxide is perovskite type oxide expressed as a composition formula $ABO_3$, wherein "A" of the composition formula includes at least one of Ca, Sr, Ba and La, wherein "B" of the composition formula includes at least Cr.

According to a second aspect of the present embodiments, there is provided a manufacturing method of a solid oxide fuel cell, the manufacturing method including: preparing a multilayer structure in which a support green sheet and an anode green sheet are stacked, the support green sheet including metal material powder, the anode green sheet including perovskite type oxide as ceramic material powder, the perovskite type oxide being expressed by a composition formula $ABO_3$ in which "A" of the composition formula includes at least one of Ca, Sr, Ba and La and "B" of the composition formula includes at least Cr, firing the multilayer structure in reductive atmosphere.

DETAILED DESCRIPTION

Hereinafter, an embodiment will be described with reference to the accompanying drawings.

Figure 1:
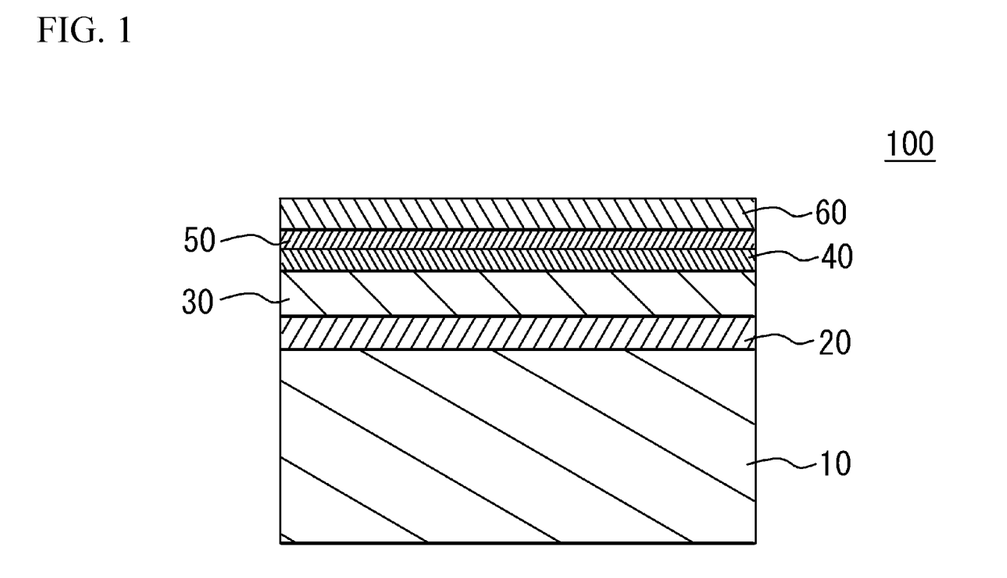
FIG. 1 is a schematic cross-sectional view of a multilayer structure of a fuel cell.

FIG. 1 is a schematic cross-sectional view of a stacking structure of a solid oxide fuel cell 100. As illustrated in FIG. 1, the fuel cell 100 has, as an example, a structure in which a mixed layer 20, an anode 30, an electrolyte layer 40, a reaction prevention layer 50, and a cathode 60 are stacked on a support 10 in this order. A plurality of the fuel cells 100 may be stacked to structure a fuel cell stack.

The electrolyte layer 40 is a dense layer that is mainly composed of solid oxide having oxygen ion conductivity and has gas impermeability. The electrolyte layer 40 is preferably mainly composed of scandia yttria stabilized zirconium oxide (ScYSZ). The oxygen ion conductivity is the highest when the concentration of $Y_2O_3+Sc_2O_3$ is 6 mol % to 15 mol %. Thus, use of a material having this composition is preferable. The thickness of the electrolyte layer 40 is preferably 20 μm or less, further preferably 10 μm or less. The thinner electrolyte layer is better. However, to prevent gas at the upper face side and gas at the lower face side from leaking, the thickness is preferably 1 μm or greater.

The cathode 60 is an electrode having electrode activity as a cathode, and has electron conductivity and oxygen ion conductivity. For example, the cathode 60 is lanthanum strontium cobaltite (LCS) having electron conductivity and oxygen ion conductivity. LSC is $LaCoO_3$ doped with strontium (Sr).

The reaction prevention layer 50 is mainly composed of a component that prevents reaction between the electrolyte layer 40 and the cathode 60. For example, the reaction prevention layer 50 is mainly composed of Gd-doped ceria (GDC) that is $CeO_2$ doped with gadolinium (Gd). As an example, when the electrolyte layer 40 contains ScYSZ and the cathode 60 contains LSC, the reaction prevention layer 50 prevents the following reactions.

Figure 2:
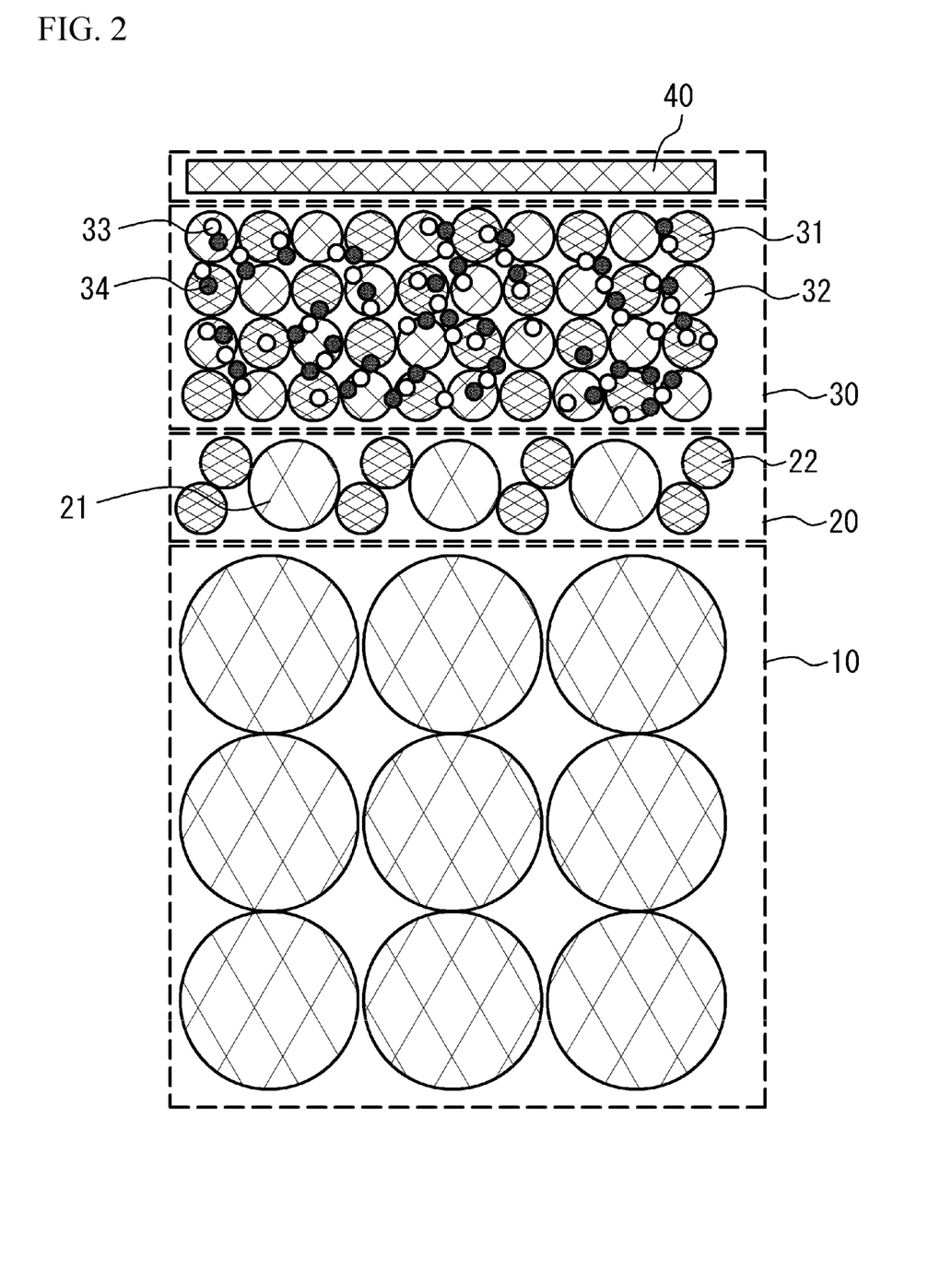
FIG. 2 is an enlarged cross-sectional view of details of a support, a mixed layer, and an anode.

FIG. 2 is an enlarged cross-sectional view illustrating details of the support 10, the mixed layer 20, and the anode 30. As illustrated in FIG. 2, the support 10 is a member that has gas permeability and is able to support the mixed layer 20, the anode 30, the electrolyte layer 40, the reaction prevention layer 50, and the cathode 60. The support 10 is a porous metallic material, and is, for example, a porous material of Fe—Cr alloys.

The anode 30 is an electrode having electrode activity as an anode, and has an electrode bone structure made of a ceramic material. The electrode bone structure contains no metallic component. In this configuration, decrease in the porosity in the anode due to coarsening of a metallic component is inhibited during firing in a high-temperature reductive atmosphere. Additionally, alloying with a metallic component of the support 10 is inhibited, and deterioration of the catalyst function is inhibited.

The electrode bone structure of the anode 30 preferably has electron conductivity and oxygen ion conductivity. The anode 30 preferably contains a first oxide 31 as an electron conductive material. The first oxide 31 can be a perovskite-type oxide expressed by the composition formula of $ABO_3$ where the A site is at least one selected from a group consisting of Ca, Sr, Ba, and La, and the B site includes at least Cr. The perovskite-type oxide has favorable electron conductivity. The mole fraction of the B site may be equal to or greater than the mole fraction of the A site (B≥A). More specifically, the first oxide 31 can be a $LaCrO_3$-based material. The B site of the perovskite-type oxide included in the first oxide 31 may include another element such as Ti, in addition to Cr. For example, when the $LaCrO_3$-based material is expressed by $LaCr_xTi_{1-x}O_3$ because the B site includes both Ti and Cr, x is 0.5 or more and 1 or less.

When the amount of $CrO_3$ generated by decomposition of the first oxide 31 is large in the anode 30, the anode 30 may not necessarily achieve favorable electron conductivity. And so, it is preferable that the amount of $CrO_3$ has a lower limit. For example, when the cross section of the anode 30 is observed, it is preferable that {the area of $CrO_3$/(the area of $CrO_3$ and the area of the first oxide 31)} is 10% or less. It is more preferable that {the area of $CrO_3$/(the area of $CrO_3$ and the area of the first oxide 31)} is 5% or less. It is still more preferable that {the area of $CrO_3$/(the area of $CrO_3$ and the area of the first oxide 30} is 1% or less. It is possible to measure the area of the perovskite oxide and the area of $CrO_3$, by SEM-EDS mapping of the cross section.

The electrode bone structure of the anode 30 preferably contains a second oxide 32 as an oxygen ion conductive material. The second oxide 32 is ScYSZ or the like. For example, it is preferable to use ScYSZ having the following composition range. Scandia ($Sc_2O_3$) is 5 mol % to 16 mol %, and yttria ($Y_2O_3$) is 1 mol % to 3 mol %. It is more preferable to use ScYSZ of which the total additive amount of scandia and yttria is 6 mol % to 15 mol %. This is because the highest oxygen ion conductivity is obtained in this composition range. The oxygen ion conductive material is, for example, a material with a transference number of oxygen ion of 99% or greater. GDC may be used as the second oxide 32. In the example of FIG. 2, a solid oxide identical to the solid oxide contained in the electrolyte layer 40 is used as the second oxide 32.

As illustrated in FIG. 2, in the anode 30, for example, the first oxide 31 and the second oxide 32 form the electrode bone structure. This electrode bone structure forms a plurality of pores. A catalyst is carried on the surface exposed to the pore of the electrode bone structure. Thus, in the spatially continuously formed electrode bone structure, a plurality of catalysts is spatially dispersed. A composite catalyst is preferably used as the catalyst. For example, a third oxide 33 having oxygen ion conductivity and a catalyst metal 34 are preferably carried, as a composite catalyst, on the surface of the electrode bone structure. The third oxide 33 may be, for example, $BaCe_{1-x}Zr_xO_3$ doped with Y (BCZY, x=0 to 1), $SrCe_{1-x}Zr_xO_3$ doped with Y (SCZY, x=0 to 1), $LaScO_3$ doped with Sr (LSS), or GDC. Ni or the like may be used as the catalyst metal 34. The third oxide 33 may have a composition identical to that of the second oxide 32, or may have a composition different from that of the second oxide 32. A metal acting as the catalyst metal 34 may be in a form of compound when electric power is not generated. For example, Ni may be in a form of a nickel oxide (NiO). These compounds are reduced with a reductive fuel gas supplied to the anode 30, and becomes in a form of metal acting as an anode catalyst.

From a viewpoint of favorable power generation performance of the fuel cell 100, it is preferable that the area of the electron conductive path, the area of the ion conductive path, and the area of the pore are appropriately balanced. For example, in the cross section of the anode 30, it is preferable that each of the area of the first oxide 31, the area of the second oxide 32 and the area of the pore is 20% or more and 60% or less. For example, in the cross section of the anode 30, the area ratio of the first oxide 31 is 60%, the area ratio of the second oxide 32 is 20%, and the area ratio of the pore is 20%. Alternatively, in the cross section of the anode 30, it is preferable that each of the area ratio of the first oxide 31, the area ratio of the second oxide 32, and the area ratio of the pore is 33%.

The mixed layer 20 contains a metallic material 21 and a ceramic material 22. In the mixed layer 20, the metallic material 21 and the ceramic material 22 are randomly mixed. Thus, a structure in which a layer of the metallic material 21 and a layer of the ceramic material 22 are stacked is not formed. Also in the mixed layer 20, a plurality of pores is formed. The metallic material 21 is not particularly limited as long as the metallic material 21 is a metal. In the example of FIG. 2, a metallic material identical to the metallic material of the support 10 is used as the metallic material 21. The first oxide 31 or the second oxide 32 can be used as the ceramic material 22. For example, ScYSZ, GDC, a $LaTiO_3$-based material, or a $LaCrO_3$-based material can be used as the ceramic material 22. Since the $LaTiO_3$-based material and the $LaCrO_3$-based material have high electron conductivity, the ohmic resistance in the mixed layer 20 can be reduced. It is preferable that the same oxide of the first oxide 31 is used as the ceramic material 22.

The fuel cell 100 generates power by the following actions. An oxidant gas containing oxygen, such as air, is supplied to the cathode 60. At the cathode 60, oxygen reaching the cathode 60 reacts with electrons supplied from an external electric circuit to become oxygen ions. The oxygen ions conduct through the electrolyte layer 40 to move to the anode 30 side. On the other hand, a fuel gas containing hydrogen, such as a hydrogen gas or a reformed gas, is supplied to the support 10. The fuel gas reaches the anode 30 through the support 10 and the mixed layer 20. Hydrogen reaching the anode 30 release electrons at the anode 30 and reacts with oxygen ions conducting through the electrolyte layer 40 from the cathode 60 side to become water ($H_2O$). The released electrons are drawn out to the outside by the external electric circuit. The electrons drawn out to the outside are supplied to the cathode 60 after doing electric work. Through the above-described actions, electric power is generated.

In the above-described power generation reaction, the catalyst metal 34 acts as a catalyst in the reaction between hydrogen and oxygen ions. The first oxide 31 conducts electrons obtained by the reaction between hydrogen and oxygen ions. The second oxide 32 conducts oxygen ions reaching the anode 30 from the electrolyte layer 40.

The fuel cell 100 of the embodiment has the support 10 of which the main component is a metal. Therefore, the fuel cell 100 has resistance against thermal shock, mechanical shock and so on. The support 10 can be fired in strong reductive atmosphere because the main component of the support 10 is a metal. The first oxide 31 is the perovskite type oxide of which the composition formula is expressed as $ABO_3$. The A site includes at least one of Ca, Sr, Ba, and La. The B site includes at least Cr. It is possible to fire the anode 30 in the strong reductive atmosphere. It is therefore possible to fire the support 10 together with the anode 30. And it is possible to make the fuel cell 100. The first oxide 31 has favorable electron conductivity. Therefore, the fuel cell 100 can achieve favorable power generation performance.

In the fuel cell 100 according to the present embodiment, the support 10 is mainly composed of a metal, and the electrode bone structure of the anode 30 is composed of ceramic. In the aforementioned structure, when firing is performed such that the support 10 and the anode 30 are in contact with each other, the difference in material properties between metal and ceramic may cause interlayer peeling between the support 10 and the anode 30. In particular, ceramic fired in a strong reductive atmosphere has poor adhesiveness with metal. In contrast, it is preferable that the fuel cell 100 according to the present embodiment includes the mixed layer 20 interposed between the support 10 and the anode 30. Since the mixed layer 20 contains the metallic material 21 and the ceramic material 22, the mixed layer 20 has material properties of metal and material properties of ceramic. Thus, the mixed layer 20 has high adhesiveness with the support 10 and high adhesiveness with the anode 30. Therefore, interlayer peeling between the support 10 and the anode 30 can be inhibited.

Additionally, in the fuel cell 100 according to the present embodiment, the third oxide 33 is carried on the electrode skeleton of the anode 30. This structure allows to first form the electrode bone structure by firing, and then, impregnate the electrode bone structure with the third oxide 33 and fire the electrode bone structure at low temperature. Thus, even when the second oxide 32 and the third oxide 33 do not have the same composition, reaction between oxides is inhibited. Therefore, the degree of freedom to select, as the third oxide 33, an oxide appropriate to the composite catalyst is increased.

Additionally, the porosity in the support 10, the porosity in the mixed layer 20, and the porosity in the anode 30 preferably have a relationship of the porosity in the support 10>the porosity in the mixed layer 20>the porosity in the anode 30. This relationship allows the support 10 to have sufficient gas permeability. Since the anode 30 has a comparatively low porosity, the anode 30 obtains high electron conductivity and high oxygen ion conductivity while maintaining gas permeability. The mixed layer 20 obtains gas permeability and the contact area with the support 10 is obtained. Thus, the mixed layer 20 obtains the adhesion with the support 10. The porosity is calculated from the ratio of the estimated area of the pores to the entire area based on an SEM image of the cross-section of a sample.

Figure 3:
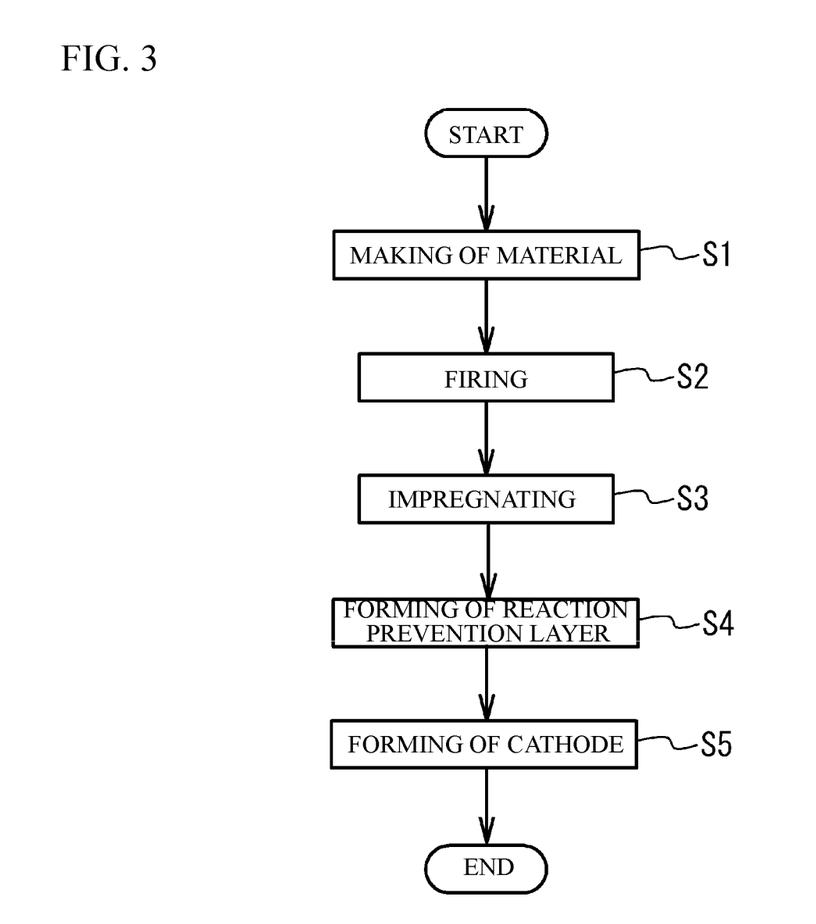
FIG. 3 is a flowchart of the manufacturing method of a fuel cell.

Hereinafter, a manufacturing method of the fuel cell 100 will be described. FIG. 3 is a flowchart of the manufacturing method of the fuel cell 100.

Making Process of Material for Support

Metallic powder having a particle size of, for example, 10 μm to 100 μm, a plasticizer, a solvent, a vanishing material, and a binder are mixed to make slurry as a material for support. The amount of the plasticizer is adjusted to, for example, 1 wt % to 6 wt % to adjust the adhesiveness of the sheet. The solvent is toluene, 2-propanol (IPA), 1-butanol, terpineol, butyl acetate, ethanol, or the like. The amount of the solvent is 20 wt % to 30 wt % depending on the viscosity or the like. The vanishing material is an organic substance. The binder is PVB, acrylic resin, ethyl cellulose, or the like. The material for support is used as a material for forming the support 10. The ratio of the volume of the organic components (the vanishing material, the solid component of the binder, and the plasticizer) to the volume of the metallic powder is within a range of, for example, 1:1 to 20:1. The amount of the organic components is adjusted depending on the porosity.

Making Process of Material for Mixed Layer

Ceramic material powder, which is the raw material of the ceramic material 22, metallic material powder having a small particle size, which is the raw material of the metallic material 21, a solvent, a plasticizer, and a binder are mixed to make slurry as a material for mixed layer. The ceramic material powder has a particle size of, for example, 100 nm to 10 μm. The metallic material powder has a particle size of, for example, 1 μm to 10 μm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The vanishing material is an organic substance. The binder is PVB, acrylic resin, ethyl cellulose, or the like. The ratio of the volume of the organic components (the vanishing material, the solid component of the binder, and the plasticizer) to the volume of the ceramic material powder and the metallic material powder is within a range of, for example, 1:1 to 5:1. The amount of the organic components is adjusted depending on the porosity. The diameter of the pore is controlled by adjusting the particle size of the vanishing material. The ceramic material powder may contain powder of an electron conductive material and powder of an oxide-ion conductive material. In this case, the ratio of the volume of the powder of the electron conductive material to the volume of the powder of the oxide-ion conductive material is preferably within a range of, for example, 1:9 to 9:1. Use of an electrolyte material such as ScYSZ, GDC, or the like instead of the electron conductive material also prevents the peeling of the boundary face and enables the manufacture of the cell. However, to reduce the ohmic resistance, it is preferable to mix an electron conductive material and metallic powder.

Making Process of Material for Anode

Ceramic material powder structuring the electrode bone structure, a solvent, a plasticizer, a vanishing material, and a binder are mixed to make slurry as a material for anode. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to, for example, 1 wt % to 6 wt % to adjust the adhesiveness of the sheet. The vanishing material is an organic substance. The binder is PVB, acrylic resin, ethyl cellulose, or the like. Powder of the electron conductive material that is the raw material of the first oxide 31 and has a particle size of, for example, 100 nm to 10 μm and powder of the oxygen ion conductive material that is the raw material of the second oxide 32 and has a particle size of, for example, 100 nm to 10 μm may be used as the ceramic material powder structuring the electrode bone structure. The ratio of the volume of the organic components (the vanishing material, the solid component of the binder, and the plasticizer) to the volume of the powder of the electron conductive material is within a range of, for example, 1:1 to 5:1, and the amount of the organic components is adjusted depending on the porosity. Additionally, the diameter of the pore is controlled by adjusting the particle size of the vanishing material. The ratio of the volume of the powder of the electron conductive material to the volume of the powder of the oxygen ion conductive material is within a range of, for example, 3:7 to 7:3.

Making Process of Material for Electrolyte Layer

Powder of an oxygen-ion conductive material, a solvent, a plasticizer, and a binder are mixed to make slurry as a material for electrolyte layer. The powder of the oxygen-ion conductive material is, for example, ScYSZ, YSZ, GDC, or the like, and has a particle size of 10 nm to 1000 nm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder and the plasticizer) to the volume of the powder of the oxygen ion conductive material is within a range of, for example, 6:4 to 3:4.

Making Process of Material for Cathode

Powder of lanthanum strontium cobaltite (LSC: LaSrCoO$_3$), a solvent, a plasticizer, and a binder are mixed to make slurry as a material for cathode. The solvent is toluene, 2-propanol (IPA), 1-butanol, terpineol, butyl acetate, ethanol, or the like, and the amount of the solvent is 20 wt % to 30 wt % depending on the viscosity. The plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder, the plasticizer) to the volume of LSC powder is within a range of, for example, 6:4 to 1:4.

Firing Process

A support green sheet is made by applying the material for support on a polyethylene terephthalate (PET) film. A mixed layer green sheet is made by applying the material for mixed layer on another PET film. An anode green sheet is made by applying the material for anode on yet another PET film. An electrolyte layer green sheet is made by applying the material for electrolyte layer on yet another PET film. For example, several support green sheets, one mixed layer green sheet, one anode green sheet, and one electrolyte layer green sheet are stacked in this order, cut into a predetermined size, and fired within a temperature range of approximately 1100° C. to 1300° C. in a reductive atmosphere with an oxygen partial pressure of $10^{-16}$ atm or less. Through the above process, a half cell including the support 10, the mixed layer 20, the electrode bone structure of the anode 30, and the electrolyte layer 40 is obtained. The reductive gas flown into the furnace may be a gas in which H$_2$ (hydrogen) is diluted with non-flammable gas (Ar (argon), He (helium), N$_2$ (nitrogen) or the like). 100% of the reductive gas may be H$_2$. From a view point of safety such as explosion limit, it is preferable that the concentration of H$_2$ has an upper limit. For example, it is preferable that the concentration of H$_2$ is 4 volume % or less, when the reductive atmosphere is a mixed gas of H$_2$ and Ar.

Impregnating Process

Next, the electrode bone structure of the anode 30 is impregnated with the raw materials of the third oxide 33 and the catalyst metal 34. For example, the following process is repeated as many times as needed such that Gd-doped ceria or Sc, Y-doped zirconia and Ni are generated when the cell is fired in a reductive atmosphere at a predetermined temperature. Nitrate or chloride of Zr, Y, Sc, Ce, Gd, or Ni is dissolved in water or alcohol (ethanol, 2-propanol, methanol or the like). A half cell is impregnated with the resulting solution, and dried. The resulting half cell is subjected to heat treatment.

Forming Process of Reaction Preventing Layer

As the reaction prevention layer 50, Ce$_{0.8}$Gd$_{0.2}$O$_{2-x}$ is formed so as to have a thickness of 1 µm by, for example, PVD.

Forming Process of Cathode

Next, the material for cathode is applied on the reaction prevention layer 50 by screen printing and is then dried. Then, a cathode is sintered by heat treatment. Through the above process, the fuel cell 100 can be fabricated.

In the manufacturing method of the embodiment, the first oxide 31 is the perovskite type oxide of which the composition formula is expressed as ABO$_3$. The A site includes at least one of Ca, Sr, Ba, and La. The B site includes at least Cr. It is possible to stably fire the anode 30 in the strong reductive atmosphere. It is therefore possible to fire the support 10 together with the anode 30. And it is possible to make the fuel cell 100. The main component of the support 10 is a metal. Therefore, the fuel cell 100 has resistance against thermal shock, mechanical shock and so on. The first oxide 31 has favorable electron conductivity. Therefore, the fuel cell 100 can achieve favorable power generation performance.

When the oxygen partial pressure in the firing atmosphere is $10^{16}$ atm or less, it is possible to suppress the generation of CrO$_3$ caused by the decomposition of the first oxide 31. Therefore, the first oxide 31 achieves favorable electron conductivity. From a view point of suppression of the generation of CrO$_3$, it is preferable that the oxygen partial pressure in the firing atmosphere is $10^{-20}$ atm or less. It is more preferable that the oxygen partial pressure is $10^{-22}$ atm or less.

Since the material for mixed layer contains the metallic material powder and the ceramic material powder, the mixed layer 20 after the firing the metallic material 21 and the ceramic material 22. Therefore, the mixed layer 20 has material properties of the metallic material 21 and the ceramic material 22. Therefore, interlayer peeling between the support 10 and the anode 30 can be inhibited.

Additionally, the amount of the vanishing material in the material for support, the amount of the vanishing material in the material for mixed layer, the amount of the vanishing material in the material for anode are preferably adjusted such that the porosity in the support 10, the porosity in the mixed layer 20, and the porosity in the anode 30 have a relationship of the porosity in the support 10>the porosity in the mixed layer 20>the porosity in the anode 30. This relationship allows the support 10 to have sufficient gas permeability. The anode 30 becomes dense, and obtains high oxygen ion conductivity. The mixed layer 20 obtains gas permeability, and also obtains the contact area with the support 10, thereby obtaining adhesion with the support 10.

In the manufacturing method according to the present embodiment, the electrode bone structure is first formed by firing. Then, the electrode bone structure is impregnated with the composite catalyst and fired at low temperature (for example, 850° C. or less). Thus, even when the second oxide 32 and the third oxide 33 do not have the same composition, the reaction between oxides is inhibited. Therefore, the degree of freedom to select, as the third oxide 33, an oxide appropriate to the composite catalyst is increased.

EXAMPLES

The fuel cell 100 was fabricated according to the manufacturing method in accordance with the above embodiment.

Example 1

SUS (stainless) powder was used as the material for support. ScYSZ was used as the electrolyte layer 40. A LaCrO$_3$-based material was used for the first oxide 31 of the anode 30, and ScYSZ was used for the second oxide 32. GDC was used for the third oxide 33, and Ni was used for the catalyst metal 34. The electrode bone structure was formed of the first oxide 31 and the second oxide 32. A LaCrO$_3$-based material was used for the ceramic material 22 of the mixed layer 20. Stainless steel (SUS) was used for the metallic material 21 of the mixed layer 20. The cell after stacking was fired under a reductive atmosphere with an oxygen partial pressure of 10$^{-16}$ atm or less. Additionally, the resulting cell was impregnated with the composite catalyst, and was then fired under an air atmosphere at a temperature of 850° C. or less.

Example 2

ScYSZ was used as the electrolyte layer 40. A LaCr$_{0.9}$Ti$_{0.1}$O$_3$-based material was used for the first oxide 31 of the anode 30, and SYSZ was used for the second oxide 32. GDC was used for the third oxide 33, and Ni was used for the catalyst metal 34. The electrode bone structure was formed of the first oxide 31 and the second oxide 32. A LaCrO$_3$-based material was used for the ceramic material 22 of the mixed layer 20. SUS was used for the metallic material 21 of the mixed layer 20. The cell after stacking was fired under a reductive atmosphere with an oxygen partial pressure of 10$^{-16}$ atm or less. Additionally, the resulting cell was impregnated with the composite catalyst, and was then fired under air atmosphere at a temperature of 850° C. or less.

Comparative Example 1

A LaTiO$_3$-based material was used for the first oxide 31 of the anode 30. A LaTiO$_3$-based material was used for the ceramic material 22 of the mixed layer 20. Other conditions were the same as those of the example 1.

Comparative Example 2

A LaCrO$_3$-based material was used for the material for support. No mixed layer 20 was provided. The cell after the stacking was fired under normal atmosphere. Other conditions were the same as those of example 1.

Table 1 shows the manufacturing conditions of the examples 1 and 2, and the comparative examples 1 and 2.

anode 30. In the example 1, the ohmic resistance was 0.25 Ω·cm$^2$, and the reaction resistance of the anode 30 was 0.28 Ω·cm$^2$. In the example 2, the ohmic resistance was 0.26 Ω·cm$^2$, and the reaction resistance of the anode 30 was 0.28 Ω·cm$^2$.

From the results of the examples 1 and 2, it is thought that the anode 30 was stably fired in the strong reductive atmosphere, the first oxide 31 achieved favorable electron conductivity, and the ohmic resistance was favorable, because the first oxide 31 of the anode 30 was the perovskite type oxide expressed as the composition formula ABO$_3$ in which the A site included at least one of Ca, Sr, Ba and La, and the B site included at least Cr. From the result of the example 2, it is understood that the anode 30 achieves favorable electron conductivity even if another element such as Ti is added to the B site of the perovskite type oxide of the first oxide 31 in addition to Cr.

The cross section of the cell of the example 1 after the firing was observed by the SEM-EDS. {the area of CrO$_3$/ (the area of CrO$_3$ and the area of the first oxide 31)} in the anode 30 was 5% or less. It is thought that this was because the anode 30 was fired in the strong reductive atmosphere and the flocculation of CrO$_3$ was suppressed. The area ratio of the first oxide 31 in the cross section of the anode 30 was 27%. The area ratio of the second oxide 32 was 27%. The area ratio of the pores was 46%. Interlayer peeling did not occur in the examples 1 and 2. It is thought that this was because the mixed layer 20 was provided.

In the comparative example 1, the ohmic resistance was 0.25 Ω·cm$^2$, and the reaction resistance of the anode was 0.40 Ω·cm$^2$. In this manner, the electrical power generation performance of the comparative example 1 was less than that of the examples 1 and 2. In the strong reductive atmosphere, resistance of the LaTiO$_3$-based material against reductive force is small, and oxygen defects occur because of reduction of Ti. In this case, grain growth tends to be promoted. The anode becomes dense more easily than the LaCrO$_3$-based material of the examples 1 and 2. It is thought that the porosity of the anode after the firing was reduced, and the electrical power generation performance gets worse. The cross section of the anode was observed by the SEM-EDS. The area of the pores in the anode using the LaTiO$_3$-based material was 30% or less in the whole of the anode. It is thought that this was because gas diffusion became

TABLE 1

| | | ANODE BONE STRUCTURE | | MIXED LAYER | | | OHMIC RESISTANCE (Ω · cm$^2$) | REACTION RESISTANCE (Ω · cm$^2$) |
|---|---|---|---|---|---|---|---|---|
| | ELECTROLYTE | FIRST OXIDE | SECOND OXIDE | OXIDE | METAL | SUPPORT | | |
| EXAMPLE 1 | ScYSZ | LaCrO$_3$ | ScYSZ | LaCrO$_3$ | SUS POWDER | SUS POWDER | 0.25 | 0.28 |
| EXAMPLE 2 | ScYSZ | LaCr$_{0.9}$Ti$_{0.1}$O$_3$ | ScYSZ | LaCrO$_3$ | SUS POWDER | SUS POWDER | 0.26 | 0.28 |
| COMPARATIVE EXAMPLE 1 | ScYSZ | LaTiO$_3$ | ScYSZ | LaTiO$_3$ | SUS POWDER | SUS POWDER | 0.25 | 0.4 |
| COMPARATIVE EXAMPLE 2 | ScYSZ | LaCrO$_3$ | ScYSZ | — | — | LaCrO$_3$ | 0.31 | 0.78 |

Evaluation of Electrical Power Generation

Impedance of each of the fuel cells of the examples 1 and 2 and the comparative examples 1 and 2 was measured to separate the resistance value to measure the ohmic resistance of the fuel cell as a whole and the reaction resistance of the worse, and the high performance of the electrical power generation of the example 1 was not achieved.

In the comparative example 2, the ohmic resistance was 0.31 Ω·cm$^2$, and the reaction resistance of the anode was 0.78 Ω·cm$^2$. In this manner, the electrical power generation performance of the comparative example 2 was less than that of the examples 1 and 2. It is thought that this was because the resistance value of the ceramic support was larger than that of the metallic support. Moreover, the anode was fired in the normal atmosphere, the $LaCrO_3$-based material of the first oxide 31 was decomposed, and a large amount of $CrO_3$ was generated. The cross section of the cell of the comparative example 2 after the firing was observed by the SEM-EDS. {the area of $CrO_3$/(the area of $CrO_3$ and the area of the first oxide 31)} in the anode was approximately 30%.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:

1. A solid oxide fuel cell comprising:
a support of which a main component is a metal;
an anode supported by the support; and
a mixed layer provided between the support and the anode,
wherein the anode includes a first oxide which is $LaCrO_3$-based perovskite of which an A site is only La and of which a B site is only Cr and Ti and a second oxide having oxygen ion conductivity,
wherein the support, the mixed layer and the anode are sintered bodies which are obtained by arranging a powder material of a $LaCrO_3$-based material and a powder metal material for the mixed layer mixed together with a width in a stacking direction, on a powder metal material for the support, and arranging a powder material including the first oxide on the powder material of a $LaCrO_3$-based material and a powder metal material for the mixed layer, and sintering the powder metal material for the support, the powder material of a $LaCrO_3$-based material and the powder metal material for the mixed layer, and the powder material including the first oxide,
wherein the $LaCrO_3$-based material of the mixed layer is $LaCrO_3$-based perovskite of which an A site is only La and of which a B site is only Cr or only Cr and Ti,
wherein the anode forms an electrode bone structure with the first oxide and the second oxide having oxygen ion conductivity,
wherein the bone structure contains no metallic component, is spatially continuously formed, and includes pores and catalysts, and
wherein each of the catalysts is carried on a surface exposed to each of the pores,
wherein an ohmic resistance of the solid oxide fuel cell as a whole is 0.26 $\Omega \cdot cm^2$ or less, and
wherein a reaction resistance of the anode is 0.28 $\Omega \cdot cm^2$ or less.

2. The solid oxide fuel cell as claimed in claim 1, wherein {an area of $CrO_3$/(the area of $CrO_3$ and an area of the first oxide)} is 10% or less, in a cross section of the anode.

3. The solid oxide fuel cell as claimed in claim 1, wherein an area ratio of a total of the first oxide/a total of (the first oxide+the second oxide+the pores) in the cross section of the anode is 20% or more and 60% or less,
wherein an area ratio of a total of the second oxide/the total of (the first oxide+the second oxide+the pores) in the cross section of the anode is 20% or more and 60% or less, and
wherein an area ratio of a total of the pores/the total of (the first oxide+the second oxide+the pores) in the cross section of the anode is 20% or more and 60% or less.

4. The solid oxide fuel cell as claimed in claim 1, wherein a porosity in the support, a porosity in the mixed layer, and a porosity in the anode have a relationship of the porosity in the support>the porosity in the mixed layer>the porosity in the anode.

5. The solid oxide fuel cell as claimed in claim 1, wherein each of the catalysts includes a catalyst metal and a third oxide having oxygen ion conductivity.

6. The solid oxide fuel cell as claimed in claim 1, wherein the second oxide is scandia yttria stabilized zirconium oxide.

7. The solid oxide fuel cell as claimed in claim 1, wherein {an area of $CrO_3$/(the area of $CrO_3$ and an area of the first oxide)} is 5% or less, in a cross section of the anode.

8. The solid oxide fuel cell as claimed in claim 1, wherein the second oxide of the anode is scandia yttria stabilized zirconium oxide; and
wherein the catalysts are Gd-doped ceria and Ni.

9. The solid oxide fuel cell as claimed in claim 1, wherein the $LaCrO_3$-based material of the mixed layer is $LaCr_xTi_{1-x}O_3$ and x is 0.5 or more and less than 1.

10. The solid oxide fuel cell as claimed in claim 1, wherein an A site of the $LaCrO_3$-based material of the mixed layer is only La, and
wherein a B site of the $LaCrO_3$-based material of the mixed layer is only Cr and Ti.

11. The solid oxide fuel cell as claimed in claim 1, wherein the first oxide is $LaCr_xTi_{1-x}O_3$ and x is 0.5 or more and less than 1.

12. The solid oxide fuel cell as claimed in claim 1, wherein a ratio of the reaction resistance to the ohmic resistance is 1.12 or less.

* * * * *